US008765879B2

United States Patent
Hase et al.

(10) Patent No.: US 8,765,879 B2
(45) Date of Patent: Jul. 1, 2014

(54) MODIFIED RECYCLED POLYESTER RESIN AND MOLDED ARTICLE USING THE SAME

(75) Inventors: Tatsuya Hase, Yokkaichi (JP); Makoto Mizoguchi, Kasuga (JP)

(73) Assignees: Autonetworks Technologies, Ltd., Mie (JP); Sumitomo Wiring Systems, Ltd., Mie (JP); Sumitomo Electric Industries, Ltd., Osaka (JP); Kyushu University, Fukuoka-shi (JP)

( * ) Notice: Subject to any disclaimer, the term of this patent is extended or adjusted under 35 U.S.C. 154(b) by 12 days.

(21) Appl. No.: 13/498,255

(22) PCT Filed: Oct. 13, 2010

(86) PCT No.: PCT/JP2010/067923
§ 371 (c)(1),
(2), (4) Date: Mar. 26, 2012

(87) PCT Pub. No.: WO2011/046131
PCT Pub. Date: Apr. 21, 2011

(65) Prior Publication Data
US 2012/0184686 A1    Jul. 19, 2012

(30) Foreign Application Priority Data
Oct. 14, 2009  (JP) ................................ 2009-237267

(51) Int. Cl.
C08G 63/91    (2006.01)
C08G 59/42    (2006.01)
C08L 67/02    (2006.01)

(52) U.S. Cl.
USPC ........................... 525/438; 525/445; 525/449

(58) Field of Classification Search
USPC ................. 525/64, 65, 66, 437, 438, 445, 449
See application file for complete search history.

(56) References Cited

U.S. PATENT DOCUMENTS

| | | | |
|---|---|---|---|
| 5,807,932 A | | 9/1998 | Pfaendner et al. |
| 5,807,966 A | * | 9/1998 | Pfaendner et al. ............ 528/286 |
| 2004/0254270 A1 | | 12/2004 | Harashina |
| 2010/0311849 A1 | * | 12/2010 | Gonzalez Montiel et al. . 521/48 |

FOREIGN PATENT DOCUMENTS

| | | |
|---|---|---|
| CN | 1162325 A | 10/1997 |
| CN | 1599776 A | 3/2005 |
| JP | A-2002-030208 | 1/2002 |
| JP | A-2003-335931 | 11/2003 |
| JP | A-2003-342458 | 12/2003 |
| JP | A-2005-041964 | 2/2005 |
| JP | A-2005-232225 | 9/2005 |
| JP | A-2005-343971 | 12/2005 |
| JP | A-2008-143988 | 6/2008 |
| WO | WO 96/11978 | 4/1996 |

OTHER PUBLICATIONS

Dec. 28, 2010 International Search Report issued in International Patent Application No. PCT/JP2010/067923.
Feb. 21, 2013 Office Action issued in Chinese Patent Application No. 201080046369.6 (with English translation).
Chinese Patent Office, Notification of the Second Office Action mailed Jul. 23, 2013 in Chinese Patent Application No. 201080046369.6 w/English-language Translation.

* cited by examiner

*Primary Examiner* — Jeffrey Mullis
(74) *Attorney, Agent, or Firm* — Oliff PLC

(57) ABSTRACT

To provide a modified recycled polyester resin that has stable moldability, is capable of producing as a by-product only a small amount of gel-like material during the process of modification to allow stable cross-linking reaction, and can prevent the possibility of recleavage, and to provide a molded article using the same. The modified recycled polyester resin contains a recycled PET resin having a carboxyl group, and a modifying agent having an epoxy group and an oxazoline group, ends of the carboxyl group of the recycled PET resin being modified with the modifying agent, wherein a mole ratio between the oxazoline group and the epoxy group is within a range of 100:90 to 100:0.01, and an additive amount of the modifying agent is 0.001 to 15 parts by mass with respect to 100 parts by mass of the recycled PET resin.

20 Claims, No Drawings

MODIFIED RECYCLED POLYESTER RESIN AND MOLDED ARTICLE USING THE SAME

TECHNICAL FIELD

The present invention relates to a modified recycled polyester resin that is prepared by modifying a recycled polyester resin that is preferably made of a collected polyethylene terephthalate resin (hereinafter, a polyethylene terephthalate resin is referred to also as a PET resin) that has been once molded, such as a used PET bottle, and also relates to a molded item that is molded from the modified recycled polyester resin so as to have a predetermined shape.

BACKGROUND ART

The PET resin has excellent physical properties and the production amounts are stable. Thus, being supplied at relatively low cost, the PET resin is in widespread use as beverage and food containers such as PET bottles. Used PET bottles are separated and collected, and reused as a recycled polyethylene terephthalate resin (hereinafter, also referred to as a recycled PET resin). With an established recycle technology of PET bottles, the recycled PET resin can be used as the stable material.

Having the thermal history of being heated and melted during the process of recycle, the recycled PET resin has its molecular chains cleaved and its polymerization degree degraded. For this reason, the recycled PET resin is unusable for a molded item that requires reliability. In addition, the polymerization degree of the recycled PET resin degraded, and the melt viscosity is low, so that it is not suitable for extrusion molding. Because its crystallization rate is slow, the recycled PET resin generates spherocrystals at low temperatures to become brittle, when the extension in molding is not enough. In order to solve these problems, attempts to improve the physical properties of the recycled PET resin are made by mixing various different kinds of polymers with the recycled PET resin (see PTL1 to PTL5).

CITATION LIST

Patent Literature

PTL1: JP2008-143988 A
PTL2: JP2005-343971 A
PTL3: JP2005-041964 A
PTL4: JP2003-342458 A
PTL5: JP2003-335931 A

SUMMARY OF INVENTION

Technical Problem

However, the recycled PET resins cited in PTL1 to PTL5 have problems of having physical properties that are still unsatisfying. In addition, a recycled PET resin has a problem such that addition of a large amount of blended polymer thereto increases the cost of the recycled PET resin. Thus, it is preferable to modify the recycled PET resin by adding a smallest possible amount of modifying agent.

In order to modify a recycled PET resin with a small amount of modifying agent, a manner of reconnecting molecular chains that have been cleaved due to thermal history with the use of a modifying agent having a cross-linking effect is preferably used. When the molecular chains of the recycled PET resin are cleaved due to heat, ester bonding is decomposed, so that carboxyl groups and hydroxyl groups, which are same in amount, appear at the ends of the molecules. Thus, by adding a compound having functional groups that are reactive to carboxyl groups or hydroxyl groups of the recycled PET resin, the cleaved molecules could be reconnected.

However, it is found that the decomposed molecules having the hydroxyl groups tend to volatilize during the recycling process of the PET resin, so that the decomposed molecules having the carboxyl groups are more contained in comparison in the recycled PET resin. For this reason, the amount of the decomposed molecules having the hydroxyl groups as their ends are not constant in the recycled PET resin, so that the addition of the compound having the functional groups reactive to the hydroxyl groups of the recycled PET resin causes the insufficient reaction or aggregation due to excessive reaction, which degrades the physical properties of the modified recycled polyester resin. Therefore, a modifying agent for a recycled PET resin needs to be selected, which is reactive to the carboxyl groups whose relative content is higher.

Examples of the functional groups reactive to the carboxyl groups of the recycled PET resin include epoxy groups, carbodiimide groups and oxazoline groups. Among them, compounds, which have plurality epoxy groups or carbodiimide groups in each molecule, have been used well for long time as the cross-linking agent for a PET resin. Thus, an attempt to modify the recycled PET resin with the use of the compounds having these functional groups has been made.

However, a problem arises when the compound having the epoxy groups and the compound having the carbodiimide groups are added to react to the recycled PET resin, the gel-like compound is produced as the by-product because the reaction velocity is slow. Thus, it is cross-linked to high molecules more than necessary, which brings about wide distribution of molecular weight. When the by-product of gel-like material exists in the recycled PET resin after the reaction, the modified recycled polyester resin develops defects during molding, which degrades the stability of the physical properties of the modified recycled polyester resin.

Meanwhile, it is found that when the compound that has the oxazoline groups is added to react to the recycled PET resin, the reaction velocity is high to thus produce as a by-product only a small amount of gel-like material, which does not bring about wide distribution of molecular weight and allows stable reaction. However, there arises a problem that when the compound having the oxazoline groups is added, an effect of increasing viscosity on the recycled PET resin after the reaction is smaller than the case of adding the compound having the epoxy groups. In addition, there arises another problem that having nitrogen atoms in the molecules, the compound having the oxazoline groups could produce basic amines as the by-product. When the amines exist in the recycled PET resin after the reaction, the recycled PET resin is cleaved again, and a cross-linking effect is little obtained.

As described above, it is found that the mere addition of the functional groups reactive to the carboxyl groups to the recycled PET resin as a modifying agent does not sufficiently modifies the recycled PET resin. Objects of the present invention are to provide a modified recycled polyester resin that has stable moldability, is capable of producing as a by-product only a small amount of gel-like material during the process of modification to allow stable cross-linking reaction, and is free from the possibility of recleavage, and to provide a molded item using the same.

Solution to Problem

To achieve the objects and in accordance with the purpose of the present invention, a modified recycled polyester resin of the present invention contains a recycled PET resin having a carboxyl group, and a modifying agent having an epoxy group and an oxazoline group, ends of the carboxyl group of the recycled PET resin being modified with the modifying agent, wherein a mole ratio between the oxazoline group and the epoxy group is within a range of 100:90 to 100:0.1 and an additive amount of the modifying agent is 0.001 to 15 parts by mass with respect to 100 parts by mass of the recycled PET resin.

It is preferable that in the modified recycled polyester resin, the modifying agent is defined as a compound having an epoxy group in each molecule and a compound having an oxazoline group in each molecule, or defined as a compound having an epoxy group and an oxazoline group in each molecule.

It is preferable that in the modified recycled polyester resin, the compound having the epoxy group in each molecule is defined as one of a polymer and an oligomer in which two or more than two epoxy groups are introduced, the compound having the oxazoline group in each molecule is defined as one of a polymer and an oligomer in which two or more than two oxazoline groups are introduced, or the compound having the epoxy group and the oxazoline group in each molecule is defined as one of a polymer and an oligomer in which an epoxy group and an oxazoline group are introduced.

It is preferable that in the modified recycled polyester resin, the one of the polymer and the oligomer has one or more than one aromatic ring structure in each molecule.

In another aspect of the present invention, a molded article is made from the modified recycled polyester resin, and has a predetermined shape.

Advantageous Effects of Invention

Because the modified recycled polyester resin has the configuration of containing the recycled PET resin having the carboxyl group, and the modifying agent having the epoxy group and the oxazoline group, the ends of the carboxyl group of the recycled PET resin being modified with the modifying agent, wherein the mole ratio between the oxazoline group and the epoxy group is within a range of 100:90 to 100:0.01 and the specific amount of the modifying agent is added, the epoxy group is smaller in amount than the oxazoline group. Thus, while cross-linking is basically performed by the oxazoline group, an effect of increasing viscosity by the epoxy group can be further obtained, which allows stable cross-linking reaction without producing a gel-like material. That is, by using the oxazoline group and the epoxy group together within the above-described specific range, the problems can be solved, which arise when the oxazoline group or the epoxy group are used singly. As a result, because the sufficient effect of increasing viscosity can be obtained by using the epoxy group, and production of a gel-like material can be prevented by using the oxazoline group, stable cross-linking reaction can be performed during the process of modification of the recycled polyester resin, which allows the modified recycled polyester resin to have favorable properties.

In addition, the epoxy group can trap a basic amine that is produced from the compound having the oxazoline group as the by-product, which can prevent the amine existing in the recycled PET resin from cleaving the recycled PET resin again and thus prevent the recycled PET resin from having an insufficient cross-linking effect, which allows obtaining a favorable molded item that is made from the recycled PET resin.

DESCRIPTION OF EMBODIMENTS

A detailed description of preferred embodiments of the present invention will now be provided. A modified recycled polyester resin of the present invention is made of a recycled PET resin. A compound having a plurality of oxazoline groups in each molecule, and a compound having a plurality of epoxy groups in each molecule, are preferably added as a modifying agent to the recycled PET resin. The recycled PET resin is heated and kneaded, and thereby carboxyl groups at the ends of the molecules of the recycled PET resin are reacted to the epoxy groups and the oxazoline groups that are defined as functional groups of the modifying agent that are reactive to the carboxyl groups. Thus, the molecules of the recycled PET resin that have been cleaved can be connected again and cross-linked, thereby the modified recycled polyester resin of the present invention can be obtained.

The recycled PET resin of which the modified recycled polyester resin is made is preferably made from PET resin flakes prepared by collecting and pelletizing waste PET products such as used PET containers (PET bottles).

Examples of the compound having oxazoline groups (also referred to as the oxazoline group containing compound) that is used as the modifying agent include bisoxazoline (a low-molecular type oxazoline-group containing compound) such as 1,4-bis(4,5-dihydro-2-oxazolyl)benzene and 2,2-bis(2-oxazoline), and a polymer type oxazoline-group containing compound such as a compound prepared by introducing oxazoline groups into polyolefin that is defined as the structure through oxazoline denaturation and a compound prepared by introducing oxazoline groups into polystyrene that is defined as the structure. It is to be noted that in the present invention, the polymer type oxazoline-group containing compound includes an oligomer-type oxazoline-group containing compound.

Examples of polymer type oxazoline-group containing compound that has an aromatic ring structure among the oxazoline-group containing compounds include "EPOCROS" series, which are commercialized products manufactured by NIPPON SHOKUBAI CO., LTD. In addition, examples of the oxazoline-group containing compounds include polymer type oxazoline-group containing compounds that are prepared by grafting recinoleic-acid oxazoline derivatives and polymers using methods cited in JP2001-348442 and "Journal of Applied Polymer Science" 1997, Vol. 63, $7^{th}$ issue, pp. 883 to 894.

If a compound having no aromatic ring structure is used for the oxazoline-group containing compound, aggregation is caused even if the additive amount is adjusted during the process of modification of the recycled polyester resin, which could prevent the modified recycled polyester resin from obtaining favorable physical properties. For this reason, it is preferable that the oxazoline-group containing compound has one or more than one aromatic ring structure in each molecule. The polymer type oxazoline-group containing compound causes less aggregation than the low-molecular type oxazoline-group containing compound when they are compared. For this reason, it is more preferable to use a polymer type oxazoline-group containing compound that is prepared by introducing oxazoline-groups into a polymer having one or more than one aromatic ring structure in each molecule. Using the modifying agent as described above causes less aggregation during the process of modification, and allows stable modification to be performed. Thus, a modified recycled polyester resin having favorable physical properties can be obtained most t effectively in a convincing way.

Examples of the compound having epoxy groups (also referred to as the epoxy group containing compound) that is used as the modifying agent include a low-molecular type epoxy-group containing compound) such as 2,2-bis(4-glycidyloxyphenyl) propane and glycerol propoxylate triglycidyl ether, and a polymer type epoxy-group containing compound (including an oligomer-type epoxy-group containing compound) that contains 1,000 to 300,000 molecular mass of resin and 7 to 100 epoxy groups in each molecules. It is preferable that the epoxy-group containing compound has one or more than one aromatic ring structure in each molecule as a skeleton structure. Further, the epoxy-group containing compound is preferably a polymer type epoxy-group containing compound. Further, the epoxy-group containing compound is preferably a polymer type epoxy-group containing compound having one or more than one aromatic ring structure in each molecule.

Examples of the polymer type epoxy-group containing compound of which the resin has the aromatic ring structure include "MODIPER" series, "NOFALLOY" series, "BLEMMER" series, "FARPACK" series, and "MARPROOF" series, which are commercialized products manufactured by NOF CORPORATION. These polymer type epoxy-group containing compounds are prepared by introducing epoxy groups into polystyrene that is defined as a resin.

Examples of a polymer type epoxy-group containing compound that contains polyolefin defined as a resin include "EPOFRIEND", which is a commercialized product manufactured by DAICEL CORPORATION, and "BONDFAST" series, which are commercialized products manufactured by SUMITOMO CHEMICAL CO., LTD.

In the present invention, it is preferable that the oxazoline-group containing compound and the epoxy-group containing compound that are defined as the modifying agents are added separately. It is also preferable that one kind of modifying agent is added. In this case, a compound, which contains a constant ratio of oxazoline groups and epoxy groups in each molecule, is synthesized in advance, and can be used as the modifying agent. This compound may below-molecular type or polymer type. The compound that contains the oxazoline groups and the epoxy groups in each molecule is obtained preferably in a method for coupling an epoxy-group containing compound and an oxazoline-group containing compound under the existence of a small amount of dicarboxylic acid, or in a method for graft-polymerizing an epoxide compound having vinyl groups (e. g., 1,3-butadienemonoepoxide) to oxazoline denatured high molecules under the existence of peroxide.

In both of the case of using the oxazoline-group containing compound and the epoxy-group containing compound in combination, which are defined as the modifying agents, and the case of using the compound having the epoxy groups and the oxazoline groups in each molecule, a mole ratio between the oxazoline groups and the epoxy groups is preferably within a range of 100:90 to 100:0.1, and more preferably within a range of 100:80 to 100:0.1.

An additive amount of the modifying agent, which is defined as a total mass of the oxazoline-group containing compound and the epoxy-group containing compound or a mass of the compound having the epoxy groups and the oxazoline groups, added to the recycled polyester resin, is 0.001 to 15 parts by mass with respect to 100 parts by mass of the recycled PET resin, and is preferably 0.01 to 10 parts by mass. This is because if the additive amount of the modifying agent is smaller than the lower limit, a cross-linking effect is less obtained. On the other hand, if the additive amount of the modifying agent is larger than the upper limit, the physical properties that the PET resin itself has are lost.

It is preferable that the modification of the recycled PET resin is performed by adjusting the additive amount of the oxazoline-group containing compound and the epoxy-group containing compound, or the additive amount of the compound having the epoxy groups and the oxazoline groups, which are used as the modifying agents, with respect to the recycled PET resin such that the amount of the functional groups of the modifying agent that are reactive to the carboxyl groups of the recycled PET resin falls within the range of 0.01 to 1.0 mol with respect to 1 mol of the carboxyl groups of the recycled PET resin. The content of the carboxyl groups contained in the recycled PET resin that is to be modified can be converted from a number average molecular weight (Mn) of the recycled PET resin.

A blending method for blending the recycled PET resin and the modifying agent in modifying the recycled PET resin is not limited specifically. Examples thereof include a dry blending method for blending the recycled PET resin, which is in a crushed form, a pulverized form, a pellet form or other forms, and the modifying agent, a melt blending method for blending the materials with the use of a melt blending machine, and a melt blending method for melt blending the materials by directly charging them into a hopper of a molding machine.

During the process of modification described above, an additive such as generally-used antioxidant, stabilizer, lubricant and rubber material, may be added to the recycled PET resin as appropriate in addition to the modifying agent depending on the intended use.

A molded article of the present invention is made from the modified recycled polyester resin of the present invention so as to have a predetermined shape. A molding method thereof is not limited specifically, and a variety of molding methods can be applied. The modified recycled polyester resin of the present invention can be favorably used for extrusion molding or injection molding for a molding article, while a conventional modified recycled polyester resin is not suitably used for the molding.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

EXAMPLE

A description of the present invention will now be specifically provided with reference to Examples and Comparative Examples.

Recycled PET resins and modifying agents were blended at a given temperature with the use of a double-shaft kneader so that they had component compositions (expressed in the unit parts by mass) as indicated in TABLE 1 (Examples 1 to 13) and TABLE 2 (Comparative Examples 1 to 16), and then they were formed into pellets with the use of pelletizer. Thus, pellets of each modified recycled polyester resin were obtained. MFRs and degrees of gelation of the obtained pellets were measured. In addition, the obtained pellets were subjected to press molding (with the use of a press molding machine manufactured by TOYO SEIKI SEISAKU-SHO, LTD.), and size-2 test specimens according to the JIS K-7113 were produced to measure their tensile characteristics. The press molding described above was performed under the condition that pressure was applied on the obtained pellets at press temperature of 255 degrees C. at 10 MPa for 1 minute, and then at 20 MPa for 2 minutes, and after the application of pressure, the pellets were cooled down for 3 minutes with the use of a cooling pressing machine.

Details of the components indicated in abbreviated form in Tables 1 and 2 will be provided below.

[Recycled PET (Resin)]

R-PET: "R-PET", manuf.: UTSUMI RECYCLE SYSTEMS INC. (intrinsic viscosity (IV): 0.67±0.03)

[Oxazoline-group Containing Modifying Agent]

DHOB: "1,4-Bis(4,5-dihydro-2-oxazolyl)benzene", manuf.: TOKYO CHEMICAL INDUSTRY CO., LTD.

ERPS: "EPOCROS RPS", manuf.: NIPPON SHOKUBAI CO., LTD., Oxazoline-group Containing Polystyrene Compound A: denatured polystyrene in which epoxy groups and oxazoline groups are introduced that is synthesized in the following manner

[Synthesis of Compound a (Denatured Polystyrene in which Epoxy Groups and Oxazoline Groups are Introduced)]

50 g of EPOCROS RPS (oxazoline group: 13 mmol) (manuf.: NIPPON SHOKUBAI CO., LTD.) and 210 mg of 1,3-butadienemonoepoxide (epoxy group: 3 mol) (manuf.: TOKYO CHEMICAL INDUSTRY CO., LTD.) are charged into a labo plastmill at 200 degrees C., and kneaded therein for 1 minute. Then, 3 mg of dicumyl peroxide (manuf.: KISHIDA CHEMICAL CO., LTD) was added thereto in three times every 3 minutes. After the final addition, kneading was performed more 2 minutes. Thus, a compound A having the oxazoline groups and the epoxy groups at a ratio of 5:1 was prepared.

[Epoxy-group Containing Modifying Agent]

0115S: "MARPROOF 0115S", manuf.: NOF CORPORATION, epoxy-group containing polystyrene 0130S: "MARPROOF 01305", manuf.: NOF CORPORATION, epoxy-group containing polystyrene E-GMA: "BONDFAST 2C", manuf.: SUMITOMO CHEMICAL CO., LTD., ethylene glycidyl methacrylate copolymer

[Another Modifying Agent]

PMDA: "PYROMELLITIC DIANHYDRIDE", manuf.: WAKO PURE CHEMICAL INDUSTRIES, LTD.

A measuring method and evaluation of physical properties of the modified recycled polyester resins shown in Tables 1 and 2 are explained below.

[Tensile Strength]

The obtained test specimens were measured for tensile strengths (MPa) in accordance with the JIS K-7113 (distance between chucks: 115 mm, tensile speed of 50 mm/minute, measurement atmosphere: 23 degrees C., relative humidity: 50%). A threshold value for the tensile strengths was set to be 50 Mpa, which was a value set by considering that the value exceeds strength of an unmodified recycled PET resin, and is equal to a strength of a generally-used new PET resin. Thus, the test specimens whose tensile strengths were 50 MPa or more were regarded as passed (P), and the test specimens whose tensile strengths were below 50 MPa were regarded as failed (F).

[MFR]

The obtained pellets were measured for MFRs in accordance with the JIS K-7210 except that the temperature was set at 255 degrees C. The temperature was set based on a result of preliminary examination that a change in flow rate at this temperature was most pronounced. It was already known that with a MFR of 30 g/10 min or more under this condition, the pellets could not obtain sufficient viscosity, which prevents easy extrusion molding. Thus, the pellets whose MFRs were below 30 g/10 min were regarded as passed (P), and the pellets whose MFR were 30 g/10 min or more were regarded as failed (F).

[Gelation Degree]

When cross-linking of a PET resin proceeded to the level of gel formation, a gel-like material is formed to become whitish in dissolving the PET resin in hexafluoroisopropanol (HFIP), which is a solvent favorable to the PET resin. The existence of whitish gel-like material was visually confirmed after the obtained pellets were added to the HFIP at 25 degrees C. to have a content of 0.1 wt % and stirred gently for 24 hours while keeping the temperature. Thus, the pellets were regarded as failed (F) when the solvents in which the pellets were contained were visually confirmed to be whitish. On the other hand, the pellets were regarded as passed (P) when the solvents in which the pellets were contained were visually confirmed to be clear.

As shown by Examples 1 to 13 of Table 1, it is found that the modified recycled polyester resins of the present invention can prevent production of a gel-like material, have remarkably improved tensile strengths compared with the recycled PET resin that is yet to be modified (Comparative Example 1), and have the favorable MFRs.

In addition, the following was found from Comparative Examples of Table 2. It is found from Comparative Examples 2 to 4 that the modified recycled polyester resins cannot obtain a sufficient effect of increasing viscosity by the addition of oxazoline-group containing compounds alone, while they have increased tensile strengths. It is found from Comparative Examples 5 to 7 that gel-like materials are produced by the addition of epoxy-group containing compounds alone. It is found from Comparative Examples 8 and 9 that favorable physical properties in terms of tensile strength and gelation degree cannot be obtained by the addition of pyromellitic dianhydride alone or ethylene glycidyl methacrylate alone, which are reactive to a hydroxyl group. It is found from Comparative Examples 10 to 14 that when the mol ratio of the epoxy groups in the modifying agent is below 0.1 mol with respect to 100 mol of the oxazoline groups, the viscosity is not increased, and on the other hand, when the mol ratios are over 90, gel-like materials are produced. It is found from Comparative Examples 15 and 16 that when the additive amounts of the modifying agents are over 15 parts by mass with respect to 100 parts by mass of the R-PETs, the physical properties of the modified recycled polyester resins are degraded.

TABLE 1

| | Recycled PET | | Oxazoline-Group Containing Compound | | Epoxy-Group Containing Compound | | Oxazoline Group:Epoxy Group | Physical Property of Modified Recycled Polyester Resin | | | | |
|---|---|---|---|---|---|---|---|---|---|---|---|---|
| | | | | | | | | Tensile Strength | | MFR | | Gelation |
| | Type | Parts by mass | Type | Parts by mass | Type | Parts by mass | mol:mol | Mpa | Evaluation | g/10 min | Evaluation | Degree Evaluation |
| Example 1 | R-PET | 100 | ERPS | 5 | 0115S | 0.002 | 100:0.15 | 55.8 | P | 24 | P | P |
| Example 2 | R-PET | 100 | ERPS | 5 | 0115S | 0.01 | 100:0.74 | 60.5 | P | 20 | P | P |
| Example 3 | R-PET | 100 | ERPS | 5 | 0115S | 0.1 | 100:7.4 | 60.2 | P | 15 | P | P |
| Example 4 | R-PET | 100 | ERPS | 5 | 0115S | 0.5 | 100:37 | 60.3 | P | 9 | P | P |
| Example 5 | R-PET | 100 | ERPS | 5 | 0115S | 1 | 100:74 | 61.1 | P | 7 | P | P |
| Example 6 | R-PET | 100 | ERPS | 1 | 0115S | 0.01 | 100:3.7 | 57.5 | P | 15 | P | P |
| Example 7 | R-PET | 100 | ERPS | 1 | 0115S | 0.1 | 100:37 | 58.9 | P | 9 | P | P |
| Example 8 | R-PET | 100 | ERPS | 5 | 0130S | 0.1 | 100:14 | 60.6 | P | 11 | P | P |
| Example 9 | R-PET | 100 | ERPS | 5 | 0130S | 0.5 | 100:70 | 61.0 | P | 4 | P | P |
| Example 10 | R-PET | 100 | DHOB | 1 | 0115S | 0.1 | 100:2.2 | 57.0 | P | 21 | P | P |
| Example 11 | R-PET | 100 | DHOB | 0.5 | 0115S | 0.1 | 100:4.3 | 58.5 | P | 17 | P | P |
| Example 12 | R-PET | 100 | Compound A | 1 | Contained in Compound A | | 100:20 | 61.3 | P | 10 | P | P |
| Example 13 | R-PET | 100 | Compound A | 5 | Contained in Compound A | | 100:20 | 59.9 | P | 8 | P | P |

TABLE 2

| | Recycled PET | | Oxazoline-Group Containing Compound | | Epoxy-Group Containing Compound | | Oxazoline Group:Epoxy Group | Physical Property of Modified Recycled Polyester Resin | | | | |
|---|---|---|---|---|---|---|---|---|---|---|---|---|
| | | | | | | | | Tensile Strength | | MFR | | Gelation |
| | Type | Parts by mass | Type | Parts by mass | Type | Parts by mass | mol:mol | Mpa | Evaluation | g/10 min | Evaluation | Degree Evaluation |
| Comparative Example 1 | R-PET | 100 | Non | | Non | | — | 45.2 | F | 55 | F | P |
| Comparative Example 2 | R-PET | 100 | ERPS | 2 | Non | | — | 58.4 | P | 41 | F | P |
| Comparative Example 3 | R-PET | 100 | ERPS | 5 | Non | | — | 59.7 | P | 37 | F | P |
| Comparative Example 4 | R-PET | 100 | DHOB | 1 | Non | | — | 56.4 | P | 48 | F | P |
| Comparative Example 5 | R-PET | 100 | Non | | 0115S | 1 | — | 56.9 | P | 8 | P | F |
| Comparative Example 6 | R-PET | 100 | Non | | 0115S | 5 | — | 59.8 | P | 3 | P | F |
| Comparative Example 7 | R-PET | 100 | Non | | 0130S | 5 | — | 57 | P | 3 | P | F |
| Comparative Example 8 | R-PET | 100 | Non | | E-GMA | 5 | — | 33.5 | F | 4 | P | F |
| Comparative Example 9 | R-PET | 100 | PDMA (Modifying Agent Reactive to Hydroxyl Group) | 5 | — | | — | 35.8 | F | 30 | P | F |
| Comparative Example 10 | R-PET | 100 | ERPS | 5 | 0115S | 0.001 | 100:0.074 | 52.5 | P | 38 | F | P |
| Comparative Example 11 | R-PET | 100 | ERPS | 5 | 0115S | 2 | 100:148 | 56 | P | 10 | P | F |
| Comparative Example 12 | R-PET | 100 | ERPS | 5 | 0115S | 5 | 100:370 | 56.8 | P | 6 | P | F |
| Comparative Example 13 | R-PET | 100 | ERPS | 1 | 0115S | 0.5 | 100:185 | 57.5 | P | 7 | P | F |
| Comparative Example 14 | R-PET | 100 | ERPS | 5 | 0130S | 1 | 100:140 | 60.5 | P | 7 | P | F |
| Comparative Example 15 | R-PET | 100 | ERPS | 20 | 0115S | 0.04 | 100:0.74 | 40.6 | F | 10 | P | F |
| Comparative Example 16 | R-PET | 100 | Compound A | 20 | Contained in Compound A | | 100:20 | 42.1 | F | 11 | P | F |

The invention claimed is:

1. A modified recycled polyester resin, the resin containing:
a recycled PET resin having a carboxyl group; and
a modifying agent having an epoxy group and an oxazoline group in a same or different molecule, ends of the carboxyl group of the recycled PET resin being modified with the modifying agent alone,
wherein the modifying agent having an epoxy group has an epoxy group introduced into a polymer having a polyolefin or polystyrene as its skeletal resin, and the modifying agent having an oxazoline group has an oxazoline group introduced into a polymer having a polyolefin or polystyrene as its skeletal resin, and
wherein a mole ratio between the oxazoline group and the epoxy group is within a range of 100:90 to 100:0.1, and an additive amount of the modifying agent is 0.001 to 15 parts by mass with respect to 100 parts by mass of the recycled PET resin.

2. The modified recycled polyester resin according to claim 1, wherein the modifying agent comprises a compound having an epoxy group in each molecule, and a compound having an oxazoline group in each molecule.

3. The modified recycled polyester resin according to claim 2, wherein the compound having the epoxy group in each molecule comprises one of a polymer and an oligomer in which two or more than two epoxy groups are introduced.

4. The modified recycled polyester resin according to claim 3, wherein the one of the polymer and the oligomer has one or more than one aromatic ring structure in each molecule.

5. A molded article that is made from the modified recycled polyester resin according to claim 4, and has a predetermined shape.

6. A molded article that is made from the modified recycled polyester resin according to claim 3, and has a predetermined shape.

7. The modified recycled polyester resin according to claim 2, wherein the compound having the oxazoline group in each molecule comprises one of a polymer and an oligomer in which two or more than two oxazoline groups are introduced.

8. The modified recycled polyester resin according to claim 7, wherein the one of the polymer and the oligomer has one or more than one aromatic ring structure in each molecule.

9. A molded article that is made from the modified recycled polyester resin according to claim 8, and has a predetermined shape.

10. A molded article that is made from the modified recycled polyester resin according to claim 7, and has a predetermined shape.

11. The modified recycled polyester resin according to claim 2, wherein the compound having the epoxy group in each molecule comprises one of a polymer and an oligomer in which two or more than two epoxy groups are introduced, and the compound having the oxazoline group in each molecule comprises one of a polymer and an oligomer in which two or more than two oxazoline groups are introduced.

12. The modified recycled polyester resin according to claim 11, wherein the one of the polymer and the oligomer has one or more than one aromatic ring structure in each molecule.

13. A molded article that is made from the modified recycled polyester resin according to claim 11, and has a predetermined shape.

14. A molded article that is made from the modified recycled polyester resin according to claim 2, and has a predetermined shape.

15. A modified recycled polyester resin, the resin containing:
a recycled PET resin having a carboxyl group; and
a modifying agent having an epoxy group and an oxazoline group, ends of the carboxyl group of the recycled PET resin being modified with the modifying agent, wherein a mole ratio between the oxazoline group and the epoxy group is within a range of 100:90 to 100:0.1, and an additive amount of the modifying agent is 0.001 to 15 parts by mass with respect to 100 parts by mass of the recycled PET resin,
wherein the modifying agent comprises a compound having an epoxy group and an oxazoline group in each molecule.

16. The modified recycled polyester resin according to claim 15, wherein the compound having the epoxy group and the oxazoline group in each molecule comprises one of a polymer and an oligomer in which an epoxy group and an oxazoline group are introduced.

17. The modified recycled polyester resin according to claim 16, wherein the one of the polymer and the oligomer has one or more than one aromatic ring structure in each molecule.

18. A molded article that is made from the modified recycled polyester resin according to claim 16, and has a predetermined shape.

19. A molded article that is made from the modified recycled polyester resin according to claim 15, and has a predetermined shape.

20. A molded article that is made from the modified recycled polyester resin according to claim 1, and has a predetermined shape.

* * * * *